United States Patent [19]

Rinehart

[11] Patent Number: 5,235,773
[45] Date of Patent: Aug. 17, 1993

[54] FOLD-UP COMPACT STORAGE ICE-FISHING RIG

[75] Inventor: John R. Rinehart, Milton, Wis.

[73] Assignee: American Institute of Taxidermy, Inc., Wis.

[21] Appl. No.: 986,353

[22] Filed: Dec. 7, 1992

[51] Int. Cl.⁵ .............................................. A01K 97/12
[52] U.S. Cl. ...................................................... 43/17
[58] Field of Search ................... 43/17, 15, 16, 4, 22, 43/23

[56] References Cited

U.S. PATENT DOCUMENTS

| | | | |
|---|---|---|---|
| 3,641,693 | 2/1972 | Pinnow | 43/17 |
| 4,373,287 | 2/1983 | Grahl | 43/17 |
| 4,787,166 | 11/1988 | Vogt et al. | 43/17 |
| 5,044,108 | 9/1991 | Rinehart | 43/17 |

Primary Examiner—Mark Rosenbaum
Assistant Examiner—Chuck Y. Mah
Attorney, Agent, or Firm—Howard M. Herriot

[57] ABSTRACT

A fold-up, compact storage ice fishing tip-up rig is provided which is easily changed from fishing mode to storage mode, with the reel spool-shaft-crank trip arm assembly covered up safe from damage and entanglement when in storage mode. The ice spanning structure of the rig is a housing having a center portion with two side lids hinged thereto, with the assembly pivotally mounted in the center portion, and with a flagpole mounted thereto having a rigid flag. The assembly may be swung on its pivot from fishing position to a storage position in the center portion. The lids may be swung across one side of the center portion and locked to cover part of the assembly, and the flagpole may be swung and locked in position with the flag on the other side of the center portion covering the rest of the assembly.

4 Claims, 10 Drawing Sheets

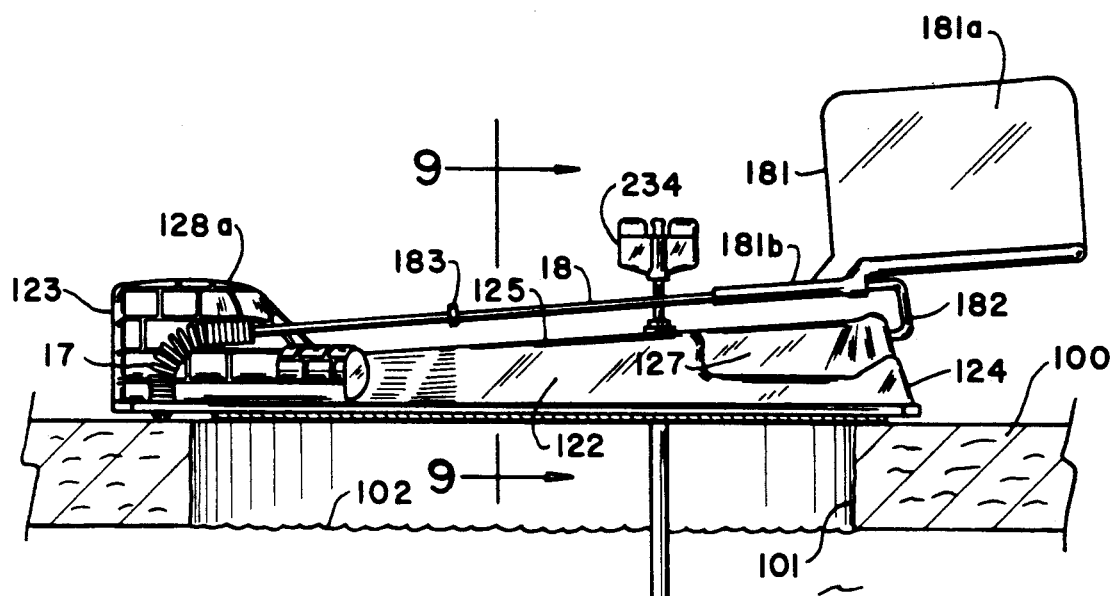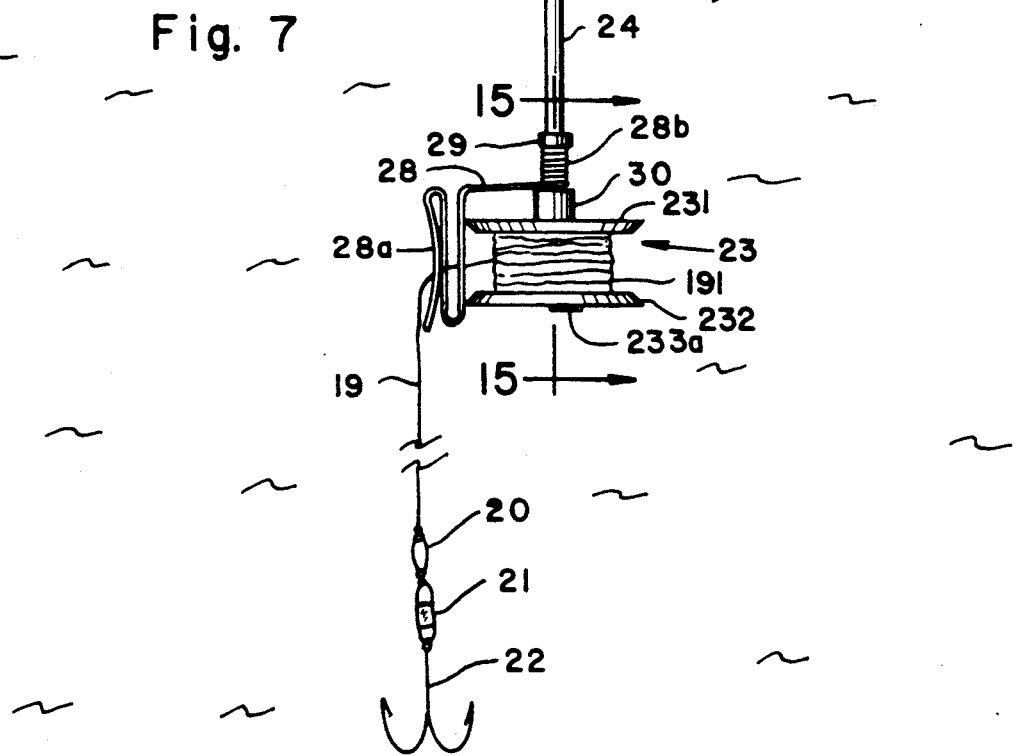
Fig. 7

FOLD-UP COMPACT STORAGE ICE-FISHING RIG

BACKGROUND OF INVENTION

Ice-fishing tip-up rigs are known in which the ice hole spanning structure has the reel spool shaft assembly pivotally mounted thereto, so the shaft may be swung from fishing position to storage and transport position with the reel spool and crank-and-tip arm against said structure, and also has the flagpole swingable to a storage and transport position against said structure. Such a rig is disclosed in U.S. Pat. No. 4,285,154. A disadvantage of such a rig is that the entire reel spool assembly (both the spool reel and the crank-and-trip arm) is stored exposed against said structure, not contained within said structure, and is thus exposed to damage or entanglement during storage and transport.

SUMMARY OF THE INVENTION

This invention provides a tip-up ice-fishing rig in which the ice hole spanning structure has storage cavities therein for receiving the reel spool assembly when it is swung pivotally from fishing position to storage position, and has foldable lid portions which, when folded to storage position, cover the reel spool, and has a rigid flag member on the flagpole so that, when the flagpole is swung from fishing position to storage position, the flag safely covers the crank-trip arm in its storage cavity. Thus, the entire reel spool assembly, including the reel spool and crank-trip arm, is stored away protectively housed within the structure, safe from damage or entanglement, for storage and transport.

BRIEF DESCRIPTION OF THE DRAWING

FIG. 1 is an elevational view of one end of the fishing rig in said mode;

FIG. 2 is an elevational view of the other end thereof;

FIG. 3 is an elevational view of one side thereof;

FIG. 4 is an elevational view of the other side thereof;

FIG. 5 is a bottom plan view thereof;

FIG. 6 is a top plan view thereof;

FIG. 7 is a sectional view, taken on line 7—7 of FIG. 8, showing the rig in its unfolded, fishing mode, positioned over a hole in the ice ready for fishing, the reel spool and crank trip assembly swung to its fishing position, and the flagpole set in its fishing position, set under the crank;

FIG. 13 is a sectional view, taken on line 13—13 of FIG. 9;

FIG. 14 is a sectional view, taken on line 14—14 of FIG. 9; and

DETAILED DESCRIPTION

Figure 8:
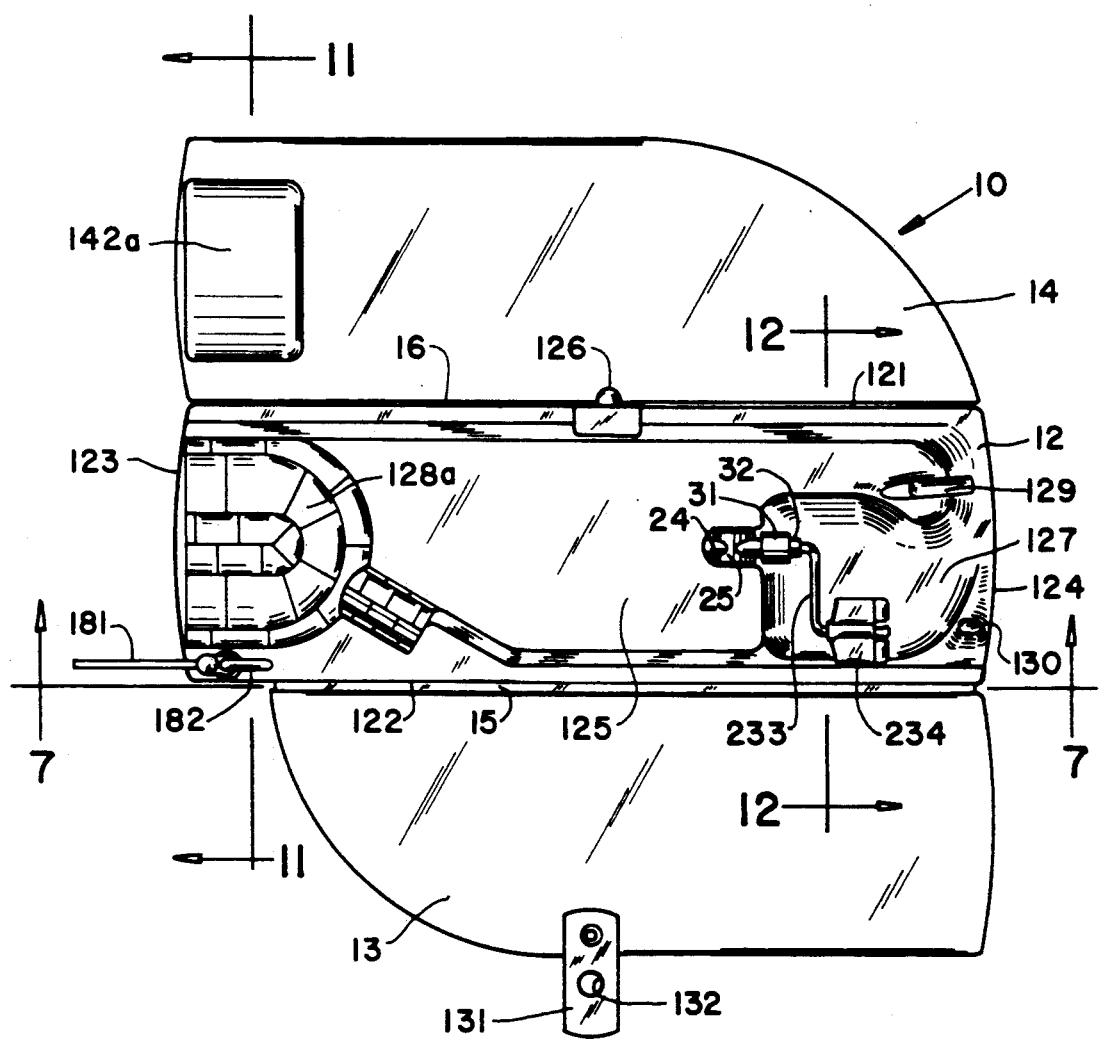
FIG. 8 is a top plan view of the rig with its housing in its unfolded, fishing mode, showing the flagpole in its upright position, but with the spool reel assembly swung to its storage and transport position.
Figure 9:
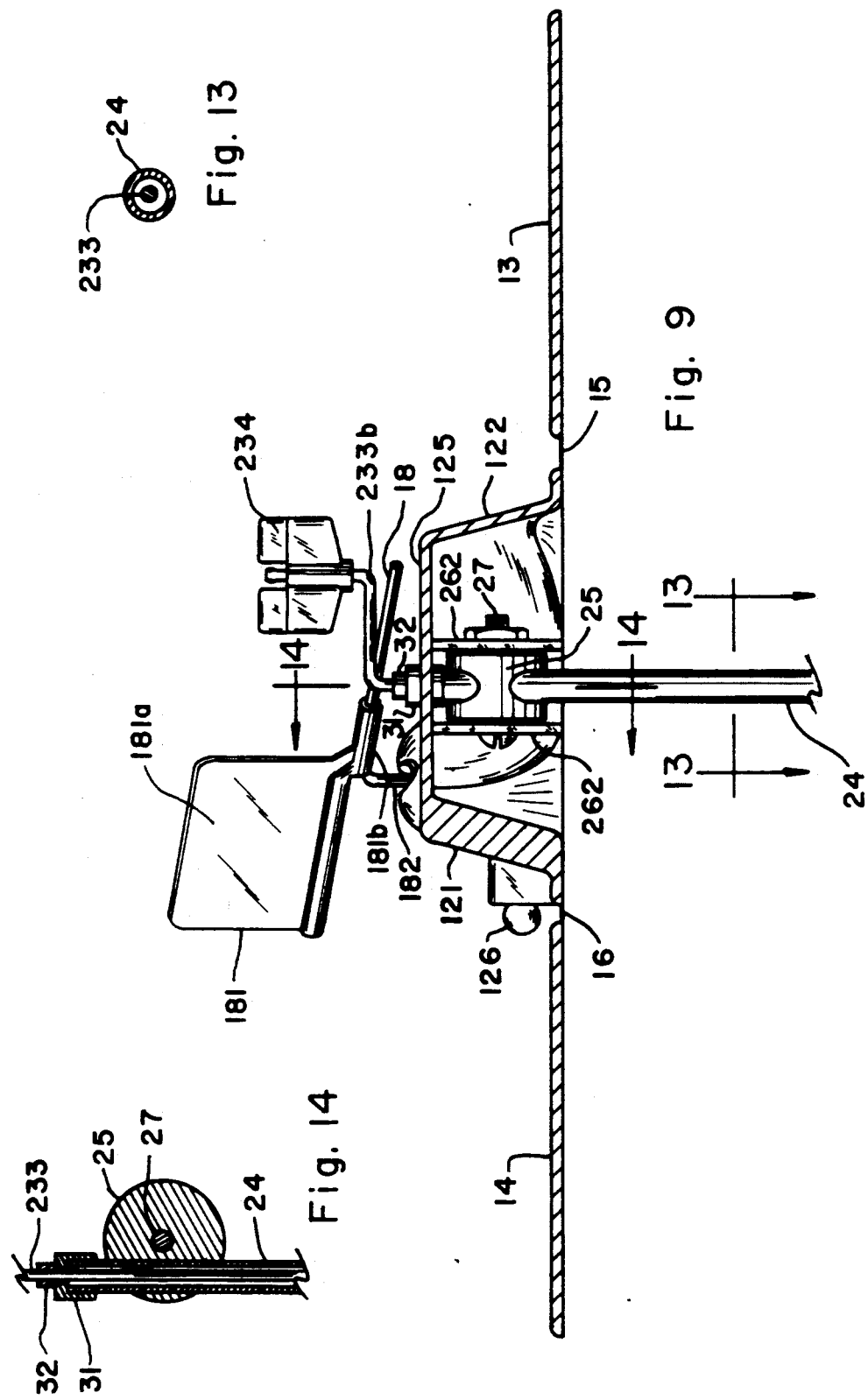
FIG. 9 is a sectional view taken on line 9—9 of FIG. 7.

Referring to FIGS. 1-6, there is shown an ice-fishing tip-up rig of my invention, in its folded-up, compact, storage and transport mode. FIGS. 7-9 show the rig in unfolded mode. The rig comprises, as its ice-hole spanning structure, a one-piece plastic molded housing having a center portion 12, a first lid portion 14, and a second lid portion 13. Lid portions 13 and 14 are hinged to the center portion respectively by hinge strip portions 15 and 16 which are thin walled, being of thickness less than that of lids 13 and 14 The width of each of lids 13 and 14 is substantially the same but slightly less than the width of the center portion 12.

The center portion 12 is of generally open bottom elongated box shape, having a central chamber and formed by a first side wall 121, a second side wall 122, first and second end walls 123 and 124, and a top wall 125.

A knob 126 projects out from side wall 121, and may be engaged by a flap 131 extending from lid portion 13, via an opening 132 in that flap, to secure lid 13 in its folded-over closed position, overlying lid 14.

Figure 1:
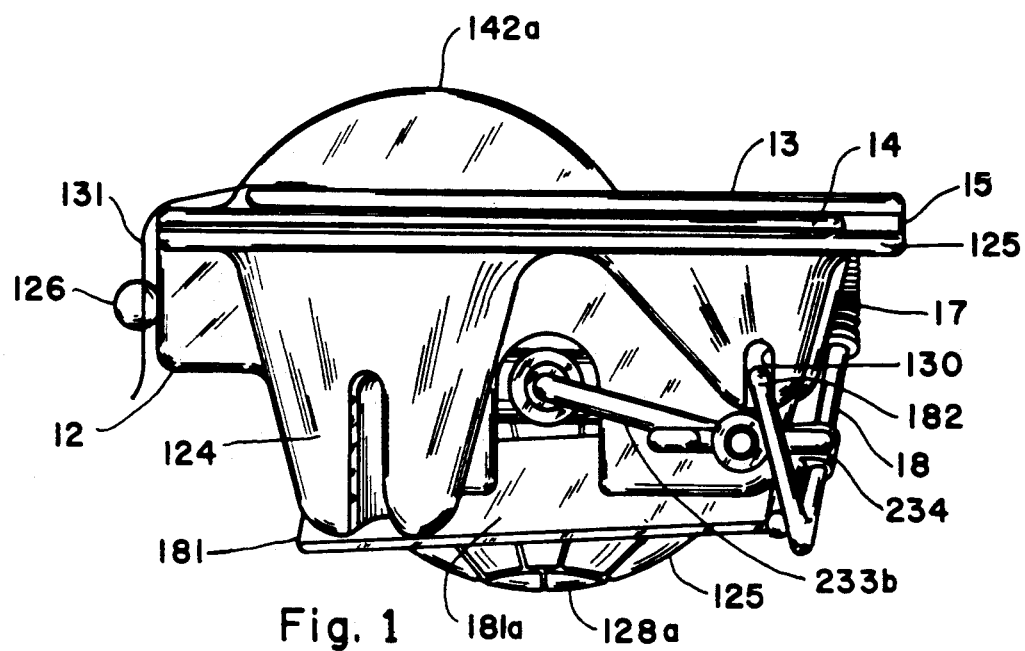
FIGS. 1-6 show the fishing rig of this invention in its closed, folded-up, compact storage and transport mode.
Figure 2:
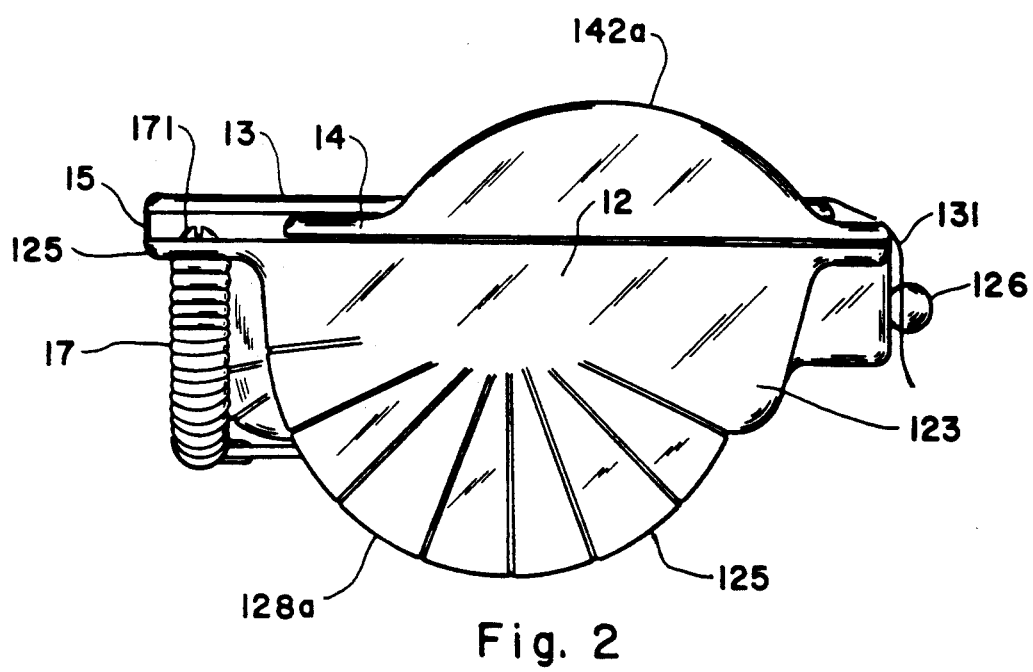
Figure 3:
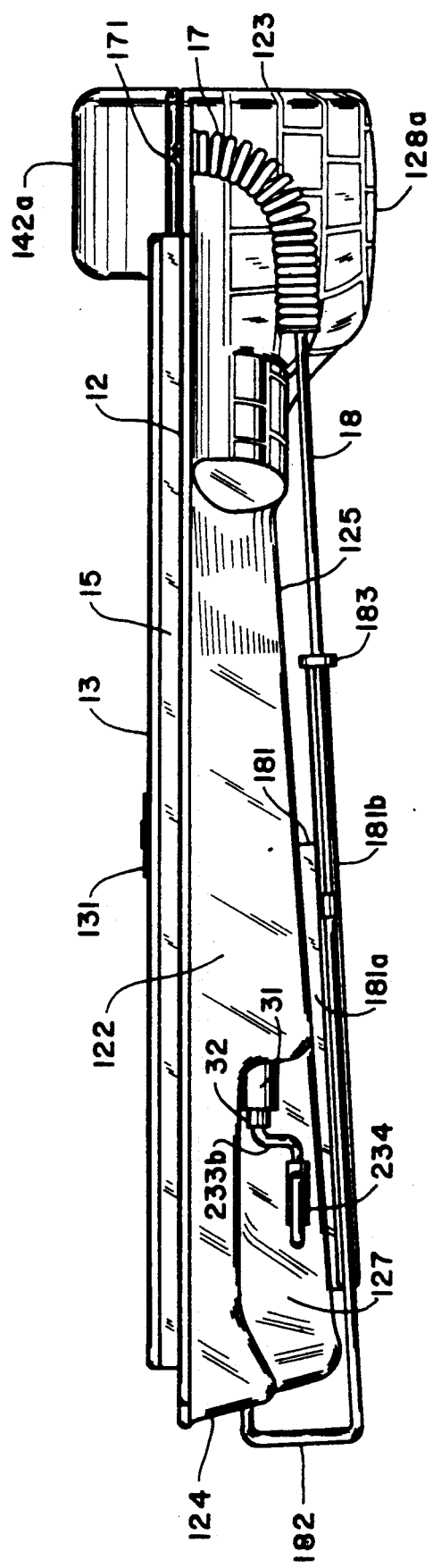
Figure 4:
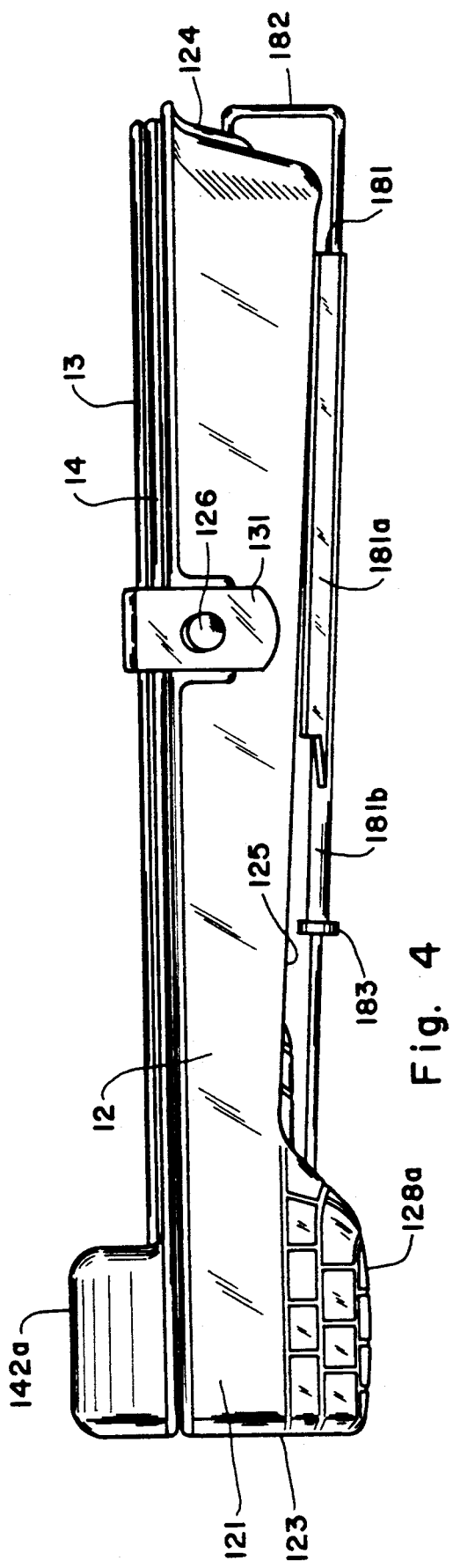

A flagpole assembly comprises a flagpole 18, a flag 131 and a coil spring 17, which is mounted to and extending up from top wall 125 near a corner thereof. A threaded fastener 171 secures spring 17 in place. The flagpole 18 is mounted to spring 17 extending therefrom a distance nearly the length of center portion 12. Flagpole 18 has rigid plastic flag 181 slidably and rotatable mounted thereon. The flag 181 has a rigid main flat portion 181a, and a split tubular portion 181b offset therefrom which grips flagpole 18 to enable sliding the flag up on down the pole and rotating it about the pole. The flagpole has a hook end 182 at its extremity. A stop ring 183, fixed to the flagpole, stops the flag in its storage and transport mode position when the flag is slid down against stop ring 183. The fishing mode position of the flag is obtained by sliding it up the flagpole against or near to the hook end 182, in which position the flag extends beyond end 124 of the housing when the flagpole is set down into fishing position. The spring 17 urges the flagpole to an upright position, but the flagpole may be swung to a down, set-for-fishing, position as shown in FIG. 7, or to a down, locked in place storage and transport position as shown in FIGS. 3 and 4.

As shown in FIG. 7, a fishing line 19 has a coiled up portion 191 on a reel spool 23, and has a sinker 20, a connector 21 and a hook 22 on the line. The reel spool 23, having an upper flange 231 a lower flange 232, is mounted on a long spin shaft 233. Shaft 233 at one end has a bent over portion 233a which is fixed to lower flange 232, as e.g. by being cemented thereto. At the other end, shaft 233 has a bent over crank and trip arm 233b. A crank handle 234 is rotatable mounted on the end of shaft 233 beyond crank and trip arm 233b.

Figure 10:
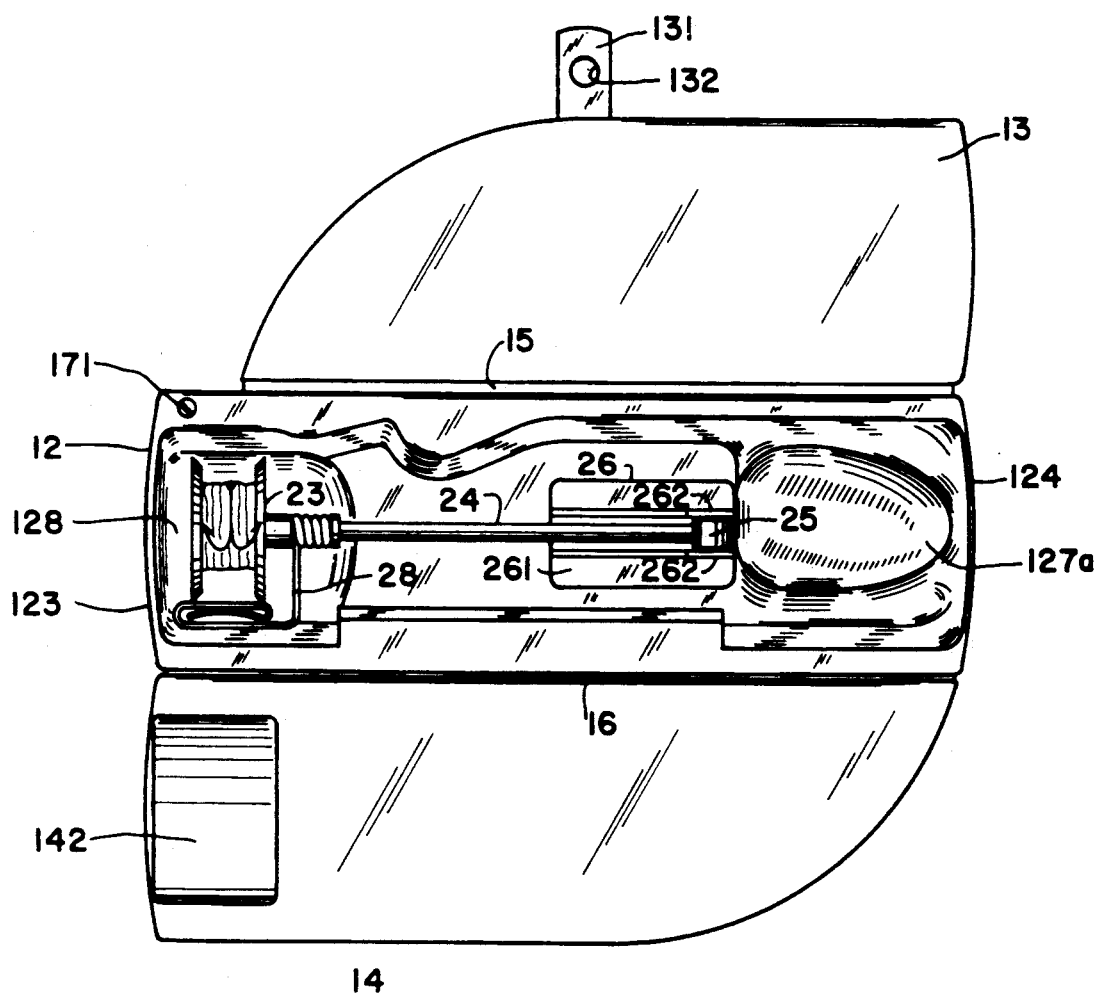
FIG. 10 is a bottom plan view of the rig in open, unfolded position, with the reel spool assembly swung from fishing position into storage position, and the two lid portions ready to be folded over the center portion to put the rig in its closed, folded-up, compact storage and transport mode.
Figure 11:
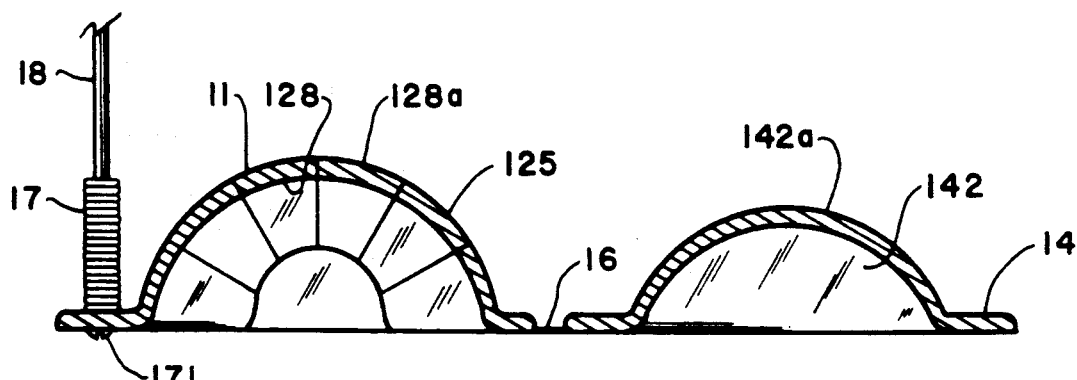
FIG. 11 is a sectional view, taken on lines 11—11 of FIG. 8.
Figure 12:
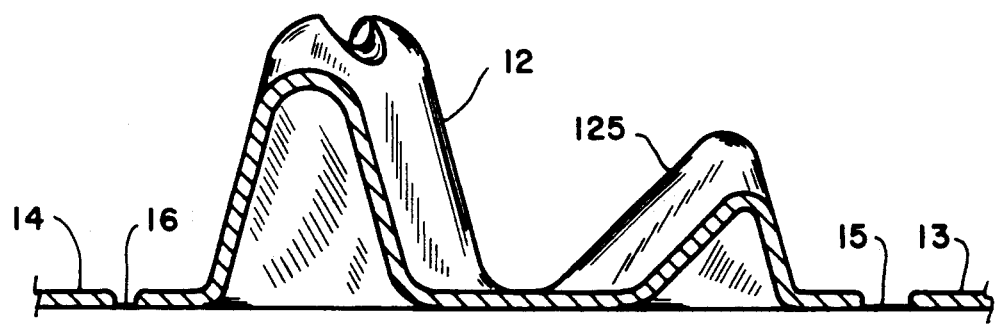
FIG. 12 is a sectional view, taken on line 12—12 of FIG. 8.
Figure 15:
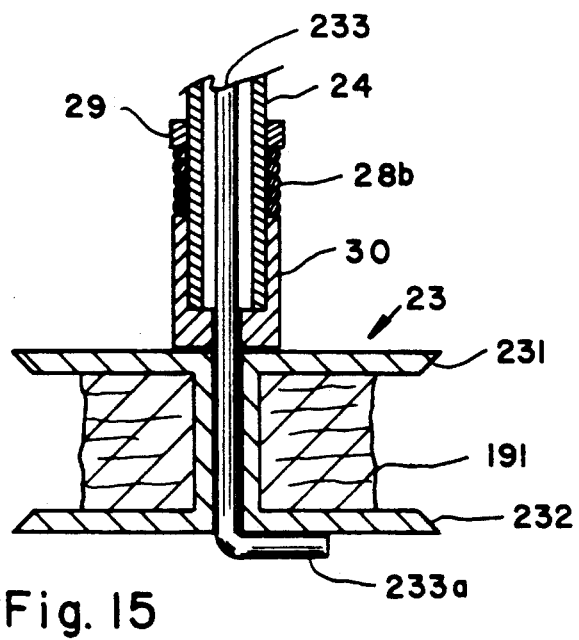
FIG. 15 is a sectional view taken on line 15—15 of FIG. 7.

Shaft 233 extends through a tube 24 which is mounted in a pivot head cylinder 25 as can be understood by reference to FIGS. 7, 9, 10, 13 and 14. Tube 24 is fixed in an offset bore in pivot head 25 as best shown in FIG. 14. Pivot head 25 is pivotally mounted in a mount rack 26 having a flat base 261 and a pair of parallel upright rack walls 262. Base 261 is fastened to top wall 125 of center portion 12 e.g., by being insert molded therein when the plastic housing is molded. Rack walls 262 extend inwardly from top wall 125 into the central chamber space between housing side walls 121, 122, as seen in FIG. 9. Pivot head 25 pivots about a pin, such as bolt 27, as best viewed in FIGS. 9 and 14. The tube 24 thus may be swung from its fishing position as shown in FIGS. 7 and 9 to its storage/transport position as shown in FIGS. 8 and 10. Tube 24 has rotatable mounted thereon a fish line grip device 28 having a coil tube portion 28b surrounding tube 24 and having a grip portion 28a extending out therefrom so as to swing about reel spool 23. A stop ring 29 fixed to tube 24 properly positions grip device 28 on tube 24, preventing it from sliding away from reel spool 28. As seen in FIG. 15, a lower cap bearing 30 caps the reel spool end of tube 24, and the cap end of cap bearing 30 is bored to provide a bearing for reel spool shaft 233, and as seen in FIG. 15, bearing 30 is held in place between spool flange 231 and tube 24. The grip device coil tube portion 28b is trapped between stop ring 29 and cap bearing 30. Referring to FIGS. 8 and 9, an upper cap bearing 31 caps the upper end of tube 24 and provides a bearing for rotating shaft 233 in the same manner as does lower cap bearing 30. Bearing 31 is held in place by a stop sleeve 32 fixed to shaft 233, the bearing being trapped between stop sleeve 32 and the upper end of tube 24.

Center portion 12 of the one-piece molded housing, in the top wall 125, near one end thereof, has a cavity 127, as shown in FIGS. 7 and 8, which cavity receives crank trip arm 233b and its handle 234 when tube 24 is swung from fishing position to storage/transport position. The handle 234 and crank trip arm 233b fit into cavity 127 as shown in FIG. 8. The backside of cavity 127 forms a hump 127a as shown in FIG. 10.

Figure 5:
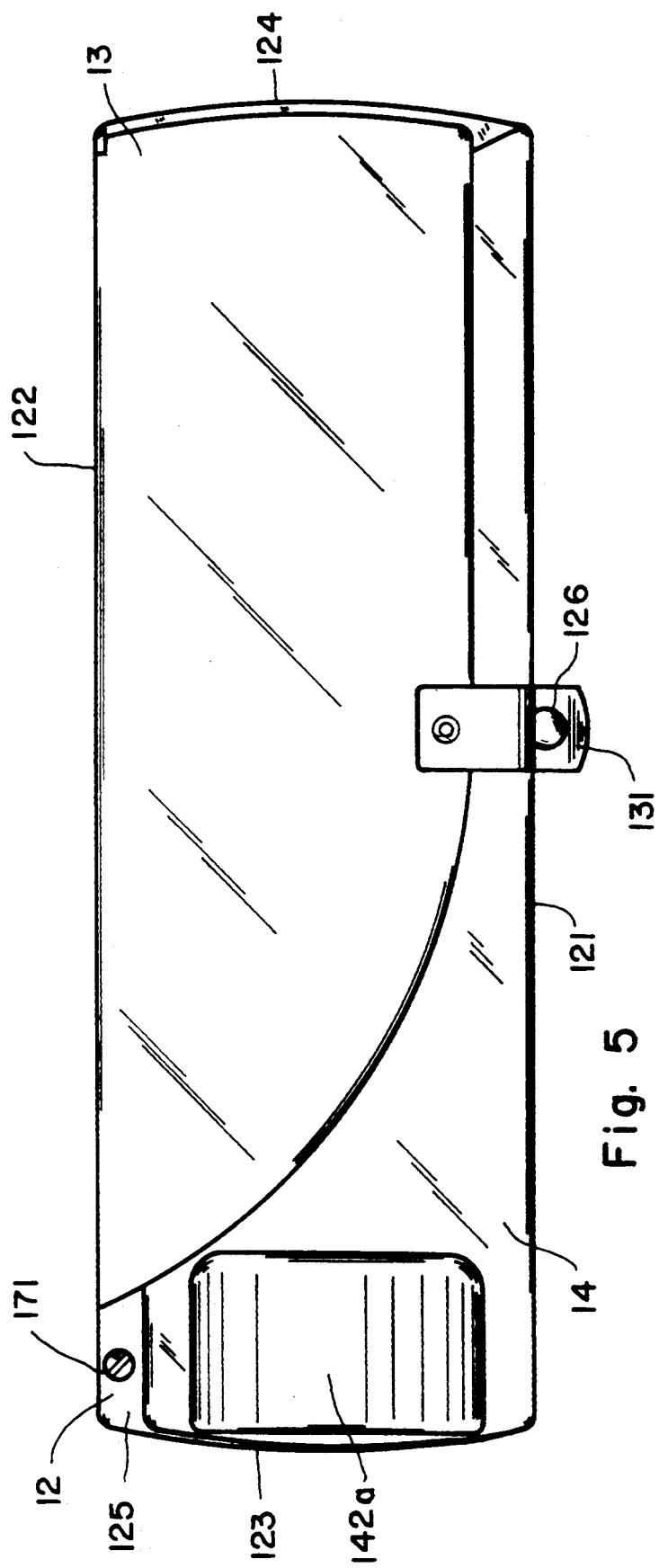

Center portion 12, near its other end, in top wall 125, has a cavity 128, the backside of which forms a hump 128a, as best seen in FIGS. 8 and 10. Cavity 128 receives part of reel spool 23 when tube 24 is swung from fishing position to storage/transport position. A cavity 142 in lid 14 is positioned so that when lid 14 is folded over center portion 12, cavity 142 overlies in registry with cavity 128, and thus receives part of spool reel 23. As seen in FIG. 10 and FIG. 5, the backside of cavity 142 forms hump 142a. Cavities 128 and 142 together completely enclose spool reel 23 when lid 14 is in its closed position overlying center portion 12.

Cavities 127 and 128 in top wall 125 are in respective reverse direction, i.e., cavity 127 extends from wall 125 in the opposite direction as cavity 128. Cavity 127 extends downwardly from top wall 125, and cavity 128 extends upwardly from top wall 125. End wall 124 of center portion 12 has an indentation 130 therein for receiving the tip of hook end 182 of the flagpole when the flagpole is swung to and locked in the storage/transport position. Also in end wall 124 is a groove 129 which loosely receives hook end 182 when the flagpole 18 is set into fishing position with pole 18 underlying crank trip arm 233b as shown in FIGS. 7 and 9.

Figure 6:
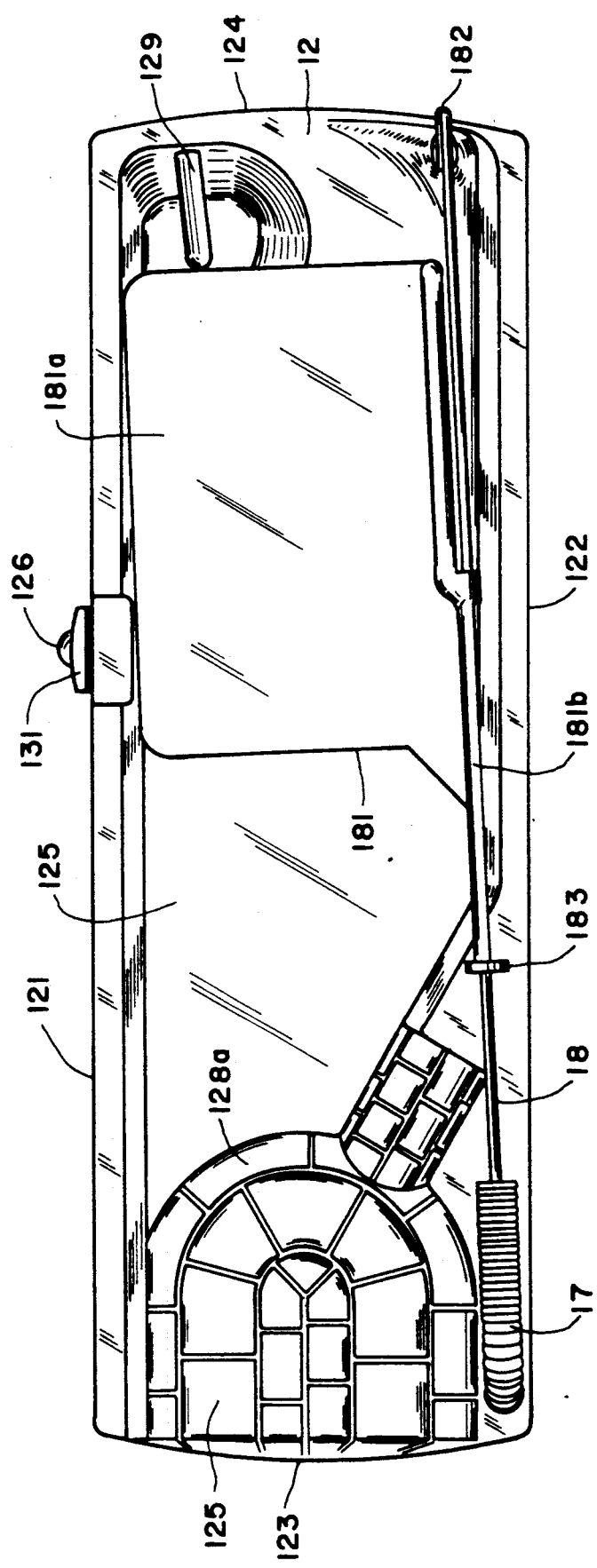

The rig is stored and transported in the closed-up, compact mode shown in FIGS. 1-6, with the flagpole in the position there shown, and the reel spool assembly protectively covered up. The reel spool assembly in its entirety is thus covered, safe from damage and entanglement, its reel spool 23, shaft tube 24, crank trip arm 233 and handle 234 all in the position as shown in FIGS. 8 and 10. The flagpole is locked in stored position by the tip of hook end 182 engaging indentation 130, with the flag overlying cavity 127 to thereby cover the crank trip arm and handle, as shown in FIG. 6. Lids 14 and 13 cover the reel spool 23 and shaft 24, and the flag main flat portion 181a covers the crank trip arm and handle in cavity 127.

The folded-up, compact rig may easily be changed from storage/transport mode to fishing mode. One merely first disengages flap 131 from knob 126, and then unfolds lids 13 and 14 to the position as shown in FIGS. 7-10. Next, the tube 24 is swung out from the housing center portion to place the reel spool assembly in fishing position, as shown in FIG. 7. One then baits the hook, sets the line 19 into grip device 28, and places the rig on the ice over the hole 101. Then, the flagpole is set for fishing by placing pole 18 under the crank trip arm 233b with hook end 182 positioned in the groove 129, and with the flag slid to the uppermost position as shown in FIG. 7.

When a fish takes the bait, pulling out line 19 from grip 28 and off spool reel 23, the spool 23 and shaft 233 rotate, and thus crank trip arm 233b swings about, releasing the flagpole so it, under the urging of spring 17, swings up to its tipped-up, upright position.

When changing the rig from the fishing mode to the storage/transport mode, one merely winds up the line on spool reel 23, using crank handle 234 to do so, swings tube 24 to place the spool reel in cavity 128 and the crank handle and crank trip arm in cavity 127, as shown in FIGS. 8 and 10. One then places the tip of flagpole hook end 182 in indentation 130, closes lid 14 over the center portion covering tube 24, closes lid 13 over lid 14 connecting flap 131 to the knob 126, and finally then slides the flag down the flagpole against stop 183 to the position shown in FIG. 6 where the main flat rigid flag portion 181a covers cavity 127 and the crank trip arm and handle lying therein. The rig is thus closed up and compact, covering the storage cavities and the parts in place stored therein, avoiding damage and entanglement during subsequent storage and transport.

I claim:
1. An ice fishing tip up rig comprising:
    a housing;
    a flagpole spring mounted to said housing; a flagpole mounted to said flagpole spring and,
    a spool reel assembly having a spool reel at one end, a crank tip arm at the other end, and a shaft therebetween, said assembly being pivotally mounted in the housing, swingable between a fishing position and a storage position;
    said housing having a center portion of generally open-bottom, elongate box shape having a central chamber, and formed by a top wall, first and second end walls, and first and second side walls;
    said top wall having an upward hump at one end of said central chamber near said first end wall providing an upward inner housing cavity within said upward hump;
    said top wall having a downward hump at the other end of said central chamber near said second end wall providing a downward outer housing cavity within said downward hump;
    said housing having a first lid hinged along the bottom edge of said first side wall swingable to a closed position covering said central chamber and said upward inner housing cavity, said first lid having an outward hump thereon forming an out- ward lid cavity within said outward hump, which lid cavity, when said lid is in closed position, registers with said inner housing cavity to form a reel spool enclosure;

said housing having a second lid hinged along the bottom edge of said second side wall swingable to a closed position covering most of said first lid except for said hump in said first lid;

said flagpole having a flat rigid flag mounted thereon, said flagpole being swingable to a storage position with said flag lying across said outer housing cavity to form a covered crank trip arm compartment;

whereby when said reel spool assembly is swung into said storage position, said first lid is closed, said second lid is closed over said first lid, and said flagpole and flag is swung to storage position, said reel spool is stored completely enclosed in said enclosure, said shaft is stored in said central chamber covered by said lids, and said crank trip arm is stored in said crank trip arm compartment.

2. The ice fishing tip up rig of claim 1, wherein said housing is a one-piece molded plastic structure.

3. The ice fishing tip up rig of claim 1, wherein the width of each of said lids is substantially the same and slightly less than the width of said center portion.

4. The ice fishing tip up rig of claim 2, wherein said first and second lids are hinged, respectively, by first and second thin walled hinge strips of thickness less than the thickness of said lids.

* * * * *